UNITED STATES PATENT OFFICE.

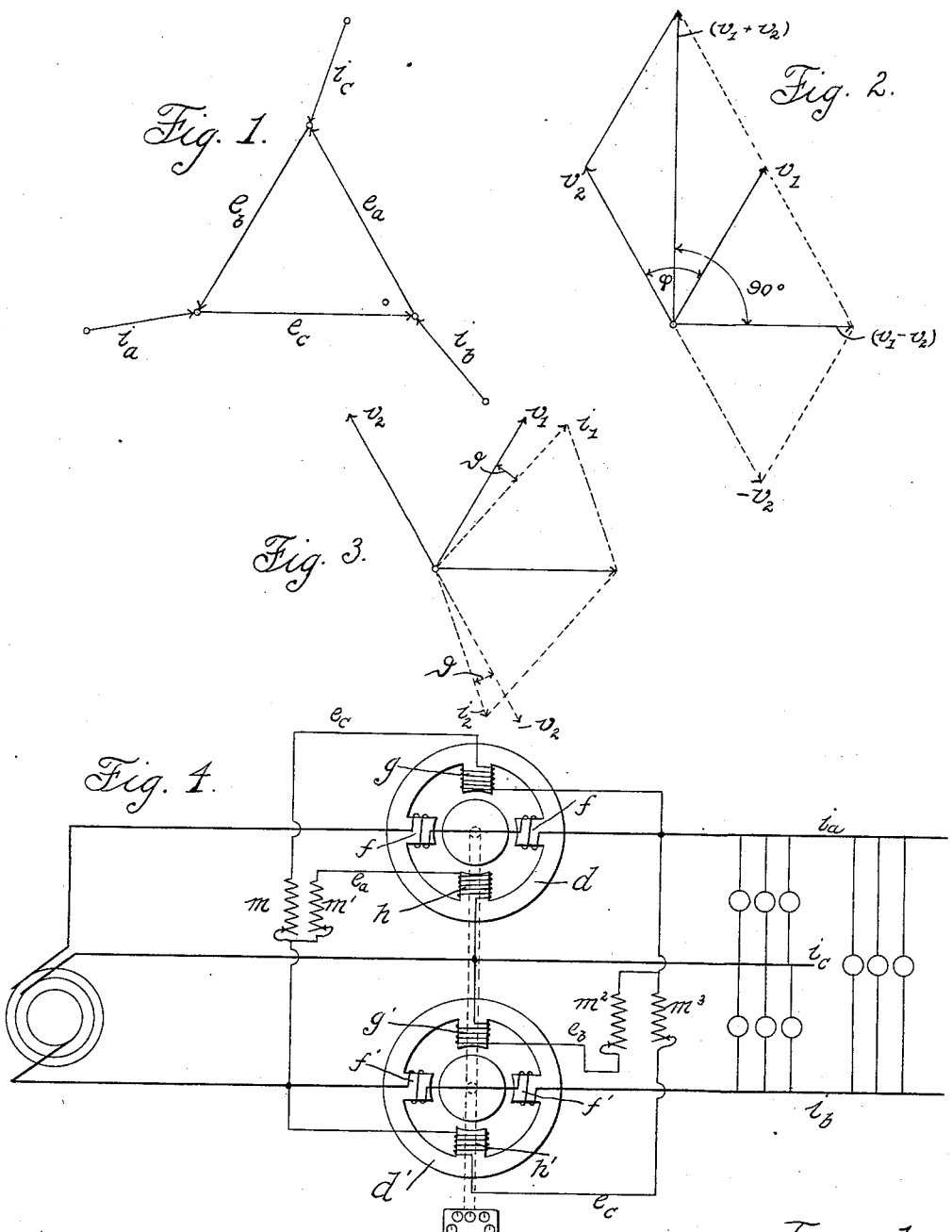

FRANZ SCHROTTKE, OF BERLIN, GERMANY, ASSIGNOR TO THE SIEMENS & HALSKE ELECTRIC COMPANY OF AMERICA, OF CHICAGO, ILLINOIS.

MEASURING INSTRUMENT.

SPECIFICATION forming part of Letters Patent No. 655,276, dated August 7, 1900.

Application filed November 18, 1899. Serial No. 737,433. (No model.)

*To all whom it may concern:*

Be it known that I, FRANZ SCHROTTKE, a subject of the Emperor of Germany, residing at Berlin, Germany, have invented a certain new and useful Improvement in Measuring Instruments, (Case No. 255,) of which the following is a full, clear, concise, and exact description, reference being had to the accompanying drawings, forming a part of this specification.

My invention relates to measuring instruments, and has for its object the provision of improved means for measuring the energy of polyphase electric circuits.

Accurately to measure the energy in a three-phase circuit it has been necessary to obtain simultaneous readings of the energy traversing each circuit thereof. It is, however, possible accurately to measure the energy contained in three-phase circuits also by the use of two separate wattmeters by employing the well-known two-wattmeter method. If induction-meters are used or meters which operate through the agency of a rotating field, it is necessary that the magnetic effects due to the current in the pressure-coil be displaced by an angle of ninety degrees from the impressed pressure which produces them.

It is the prime object of this invention to provide simple means for displacing the resultant magnetic effects due to the pressure-coils ninety degrees from their impressed pressures.

Generally speaking, my invention consists of means wherein the current traversing one circuit is combined with the geometrical sum of the pressures impressed upon two of the circuits of the system.

I will more particularly describe my invention by reference to the accompanying drawings, in which—

Figures 1, 2, and 3 are phase and vector diagrams for illustrating the electrical problems involved, and Fig. 4 is a diagrammatical arrangement of the preferred embodiment of my invention.

Similar letters of reference indicate similar parts in the different views.

In the following description it will of course be understood that the addition and subtraction of voltages and currents when out of phase is a geometrical or vector operation and not an arithmetical addition and subtraction.

The energy traversing a three-phase circuit is equal to the product of the currents traversing the separate circuits with the respective electromotive forces which produce them. This expression, mathematically expressed, will be $$a = \tfrac{1}{3}[i_a(e_c - e_b) + i_b(e_a - e_c) + i_c(e_b - e_a)], \quad (1,)$$

in which the letters $i_a$, $i_b$, and $i_c$, Fig. 1, represent the currents traversing the three circuits, and $e_a$, $e_b$, and $e_c$ represent the respective pressures which produce them. By replacing the negative resultant of two of the currents $i_a$ $i_b$ by the currents $i_c$, or, mathematically expressed, $$i_c = -(i_a + i_b),$$

we deduce from equation 1 the fact that the energy traversing the circuit is equal to one-third of the difference between two separate factors in which both factors are equal to the product of the currents traversing one of the circuits and three times the electromotive force impressed upon one of the remaining circuits, or, mathematically expressed, $$a = \tfrac{1}{3}[i_a(e_a - 2e_b + e_c) - i_b(-2e_a + e_b + e_c)].$$

As either of the pressures traversing one of the circuits is the negative resultant of the pressures traversing the other circuits, or, mathematically expressed, $$-2e_a = 2(e_b + e_c)$$
$$-2e_b = 2(e_a + e_c),$$

it follows that the total energy traversing the circuit may be divided into two separate and independent factors, the first consisting of the product between the current traversing one circuit and the geometrical sum of the pressures impressed on the remaining circuits and in which the second factor consists of the product of the current traversing one of the remaining circuits with the electromotive forces impressed on the two other circuits, or, mathematically expressed, $$a = i_a[e_a + e_c] - i_b[e_b + e_c].$$

It is obvious from this equation that four readings of a dynamometer are necessary to obtain the total work traversing the circuit, while only two readings are required if two fields are created, each proportional to two of the pressures impressed upon the circuit. In measuring this energy I preferably employ two separate induction motor-meters and provide each with two separate field-coils, each fed by one of the pressures of the circuit, thereby obtaining a resultant field which is displaced ninety degrees from the resultant of two of the pressures of the circuit.

Referring to Fig. 2, $v_1$ and $v_2$ are two equal factors which are displaced from each other by an angle $\varphi$. The geometrical sum of these two factors—that is, $v_1 + v_2$—is displaced ninety degrees from the geometrical difference—that is, $v_1 - v_2$—the two factors being equal. This principle may be applied to the present invention if the electromotive forces $e_a$ $e_b$ $e_c$ are equal. We then obtain the result that the energy traversing the circuit is again equal to the difference of the two factors in which each factor is equal to the product of the current traversing one circuit and the geometrical difference of the pressures impressed on two of the remaining circuits, or, mathematically expressed, $$a = [i_a(e_a - e_c)] - [i_b(e_b - e_c)]. \quad (3.)$$

Each one of the factors contained in this equation can therefore be measured by means of induction-meters in which each pressure-field is created by means of two separate pressures of a three-phase circuit, one of the pressures being the pressure across the circuit the current of which traverses the series coil of one of the instruments, the other pressure being one of the pressures of one of the circuits which is not included therein. Two separate pressure-coils are therefore required to produce the resultant pressure-field for each wattmeter. In the preferred embodiment of the invention I employ two separate pole-pieces for these coils, so that no divided winding is necessary for either one of the pole-pieces. The windings or the number of turns contained in each one of the pressure-coils must be equal if the current traversing this coil be in phase with its pressure. If the currents $i_1$ $i_2$, Fig. 3, are displaced from their respective pressures $v_1$ $v_2$ by an angle $\varphi$, it is necessary that their strength be varied by means of resistances in order to obtain a resultant current which is displaced ninety degrees from the resultant of the pressures producing it. As the magnetism is in phase with the current, the resultant magnetism due to these two separate currents will be displaced ninety degrees from the geometrical sum of the pressures producing it.

In the preferred embodiment of my invention, Fig. 4, I employ two induction-meters $d\ d'$, each containing two series fields $f\ f$ and two shunt pole-pieces $g\ h$ and $g'\ h'$. The series coils of the induction-meter $d$ are traversed by the current $i_a$ of one of the circuits. The current-coils of the meter $d'$ are traversed by the current $i_b$ in one of the remaining circuits. The pressure-coil $g$ of the meter $d$ is fed by the pressure $e_c$, a resistance $m$ being included in the circuit. The other shunt-field $h$ of the meter is fed by means of the pressure $e_a$, a resistance $m'$ being included in the circuit. The pressure-coil $g'$ of the meter $d'$ is fed by the pressure $e_b$, a resistance $m^2$ being included in the circuit, the other field $h'$ being fed by the pressure $e_c$, a resistance $m^3$ being included in the circuit. Two measurements may thus be performed with one measuring instrument, inasmuch as the combination of the field $g$ due to the one pressure-coil and the series coil $f$ creates a turning moment, and the combination of the pressure in the shunt-coil $h$ with the current in the current-coils $f$ produces a second turning moment. The shunt-fields $g$ and $h$ having a difference of phase are not equal at the same instant even with an equal number of ampere turns in each. The fields $g$ and $h$ will therefore sometimes be closed through the series coils $f\ f$; but this is no disadvantage and will not create any theoretical error, the constant of the meter being alone affected, as the increase of one field $g$, for instance, is accompanied by a corresponding decrease of the opposite field $h$.

In instruments which employ disks it is possible to place the pressure-coils, which are fed by separate pressures, on opposite sides thereof, this being a very advantageous arrangement. The proportionate change of the ampere turns of the two pressure-windings of the meter does not materially affect the phase of the resultant field created thereby. This is a material advantage, as the sensibility of the instrument may easily be adjusted to the desired strength without materially affecting the adjustment of the meter. If the instrument has not the desired sensibility, a proportionate decrease of the resistances included in series with the shunt-fields will increase the ampere turns upon each of the coils, and thereby increase the sensibility. If the instrument has reached the desired sensibility, a very slight change in either one of the resistances in the circuits thereof will readily adjust the phase displacement of ninety degrees of the resultant field. The driving moments actuating the moving parts of the two measuring instruments may be readily obtained from equation 3 and are proportional to the product of the current traversing the series fields and the geometrical difference of the pressures in the field-coils, or, mathematically, $$D_a = c_1 \cdot [i_a(e_a - e_c)]$$
$$D_c = c_2 \cdot [i_b(e_b - e_c)],$$

in which $D_a$ and $D_c$ represent the turning moments, and $c_1$ and $c_2$ the respective constants. If both instruments are adjusted so that the constants $c_1$ and $c_2$ are equal, their moving parts may be mechanically coupled, and I obtain a double induction-meter whose readings are proportional to the total energy threading the three-phase circuit. The energy is accurately measured by this instrument, even with an inductive loading of either of the legs of the system.

I have herein shown and particularly described the preferred embodiment of my invention; but I do not wish to be limited to the precise arrangement shown, and

I claim as new and desire to secure by Letters Patent—

1. The combination with a polyphase system of electrical distribution, of a wattmeter having motive windings comprising series and two sets of pressure coils, a pressure-coil of one set being connected in parallel with a pressure-coil of the other set, one terminal of each of the remaining pressure-coils of each set being connected to the conductor in which the series coil of the other set is included, the other terminal being connected to one of the remaining conductors of the system, substantially as described.

2. The combination with a polyphase system of electrical distribution, of a wattmeter having motive windings comprising series and two sets of pressure coils, a pressure-coil of one set being connected in parallel with a pressure-coil of the other set, one terminal of each of the remaining pressure-coils of each set being connected to the conductor in which the series coil of the other set is included, the other terminal being connected to one of the remaining conductors of the system, the first-aforesaid pressure-coils receiving their pressure from the two conductors of the circuit which includes the series coils, substantially as described.

3. The combination with a polyphase system of electrical distribution, of two electric induction-motors having rotatably-mounted armatures, indicating means adapted to be operated by said armatures, series coils each included in one of the conductors of the said system in inductive relation with the said armatures, shunt-coils in inductive relation with the said armatures, one terminal of each of the said shunt-coils being connected to the conductor in which the series coils of the respective motor members are included, the other terminal being connected to one of the remaining conductors of the system, the said pressure-coils being connected in parallel relation, and additional shunt-coils in inductive relation to the said armatures, each of the latter two shunt-coils receiving its pressure from the two conductors of the system not including its corresponding series coil, substantially as described.

4. The combination with a polyphase system of electrical distribution, of two mechanically-coupled electric induction-motors, having rotatably-mounted armatures, series coils each included in one of the conductors of the said system in inductive relation to the said armatures, shunt-coils in inductive relation to the said armatures, one terminal of each of the said shunt-coils being connected to the conductor in which the series coils of the respective motor members are included, the other terminal being connected to one of the remaining conductors of the system, the said coils being connected in parallel relation, and additional shunt-coils in inductive relation to the said armatures, each of these two shunt-coils receiving its pressure from the two conductors of the system not including its corresponding series coil, substantially as described.

In witness whereof I hereunto subscribe my name this 13th day of October, A. D. 1899.

FRANZ SCHROTTKE.

Witnesses:
HENRY HASPER,
WOLDEMAR HAUPT.